(12) United States Patent
McKelvey Campbell

(10) Patent No.: US 9,023,455 B2
(45) Date of Patent: May 5, 2015

(54) METHOD OF MAKING REINFORCED COMPOSITE ARTICLES WITH REDUCED FIBER CONTENT IN LOCAL AREAS AND ARTICLES MADE BY THE METHOD

(71) Applicant: Ford Global Technologies, LLC, Dearborn, MI (US)

(72) Inventor: Aindrea McKelvey Campbell, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/753,575

(22) Filed: Jan. 30, 2013

(65) Prior Publication Data

US 2014/0212616 A1    Jul. 31, 2014

(51) Int. Cl.
| | |
|---|---|
| *B32B 7/08* | (2006.01) |
| *B32B 3/06* | (2006.01) |
| *B32B 5/14* | (2006.01) |
| *B29C 70/84* | (2006.01) |
| *B23P 11/00* | (2006.01) |
| *B32B 7/04* | (2006.01) |
| *B62D 25/00* | (2006.01) |
| *F16B 5/02* | (2006.01) |
| *F16B 5/04* | (2006.01) |
| *B29C 70/54* | (2006.01) |

(52) U.S. Cl.
CPC ............. *B32B 7/08* (2013.01); *Y10T 29/49964* (2015.01); *Y10T 29/49826* (2015.01); *Y10T 29/49947* (2015.01); *Y10T 29/49837* (2015.01); *Y10T 29/49957* (2015.01); *Y10T 428/15* (2015.01); *B29C 70/84* (2013.01); *B23P 11/00* (2013.01); *B32B 3/06* (2013.01); *B32B 5/14* (2013.01); *B32B 7/045* (2013.01); *B62D 25/00* (2013.01); *F16B 5/02* (2013.01); *F16B 5/04* (2013.01); *B29C 70/543* (2013.01)

(58) Field of Classification Search
CPC ............ B32B 5/142; B32B 7/08; B32B 3/06; B62D 29/048
USPC ................ 428/99, 133, 137, 138, 212, 299.1, 428/299.4, 299.7, 297.4, 171; 52/309.2; 296/29, 901.01, 181.2; 264/257
See application file for complete search history.

(56) References Cited

U.S. PATENT DOCUMENTS

| | | |
|---|---|---|
| 2,845,699 A | 8/1958 | Woodard |
| 3,053,713 A | 9/1962 | Juras |
| 3,125,974 A | 3/1964 | Toulmin, Jr. |
| 3,429,766 A | 2/1969 | Stormfeltz |
| 4,327,536 A | 5/1982 | Ascher |
| 4,863,771 A | 9/1989 | Freeman |
| 4,894,102 A | 1/1990 | Halls et al. |

(Continued)

*Primary Examiner* — Maria Veronica Ewald
*Assistant Examiner* — Joanna Pleszczynska
(74) *Attorney, Agent, or Firm* — Raymond L. Coppiellie; Brooks Kushman P.C.

(57) ABSTRACT

A composite part including a resin matrix and fibers reinforcing the resin matrix in a first portion of the matrix. A second portion of the resin matrix is substantially devoid of fibers. The fibers may be in the form of a woven mat that defines an opening. Alternatively, the fibers may be loose fibers that are deposited in a mold that includes predetermined areas that are shielded from the deposit of the loose fibers. A method of making the composite part is disclosed in which a woven mat having an opening is filled with resin. Another method is also disclosed in which loose fibers are shielded from being deposited in a portion of the mold that is subsequently filled with resin.

3 Claims, 2 Drawing Sheets

(56) References Cited

U.S. PATENT DOCUMENTS

| | | | |
|---|---|---|---|
| 5,106,147 A * | 4/1992 | Okada et al. ............... 296/180.1 |
| 5,121,537 A | 6/1992 | Matsui et al. |
| 5,139,405 A | 8/1992 | Krone et al. |
| 5,151,322 A | 9/1992 | Kimoto et al. |
| 5,192,330 A | 3/1993 | Chang et al. |
| 5,884,386 A | 3/1999 | Blacket et al. |
| 5,984,055 A | 11/1999 | Strasser et al. |
| 2001/0039710 A1 | 11/2001 | Nakao et al. |
| 2003/0110727 A1* | 6/2003 | Gregori ........................ 52/489.1 |
| 2004/0134573 A1 | 7/2004 | Joaquin et al. |
| 2005/0022362 A1 | 2/2005 | Chen |
| 2005/0086799 A1 | 4/2005 | Kato et al. |
| 2006/0068215 A2* | 3/2006 | Dolinar ....................... 428/537.1 |
| 2008/0072527 A1 | 3/2008 | Kondo et al. |
| 2009/0068399 A1 | 3/2009 | Murakami et al. |
| 2009/0091159 A1 | 4/2009 | Gerish |
| 2009/0188101 A1 | 7/2009 | Durandet et al. |
| 2010/0083481 A1 | 4/2010 | Luo et al. |
| 2011/0126396 A1 | 6/2011 | Clarke et al. |
| 2011/0170983 A1* | 7/2011 | Day et al. ....................... 411/370 |
| 2011/0173844 A1 | 7/2011 | Samuels et al. |
| 2011/0314765 A1* | 12/2011 | Martel ........................ 52/745.05 |

* cited by examiner

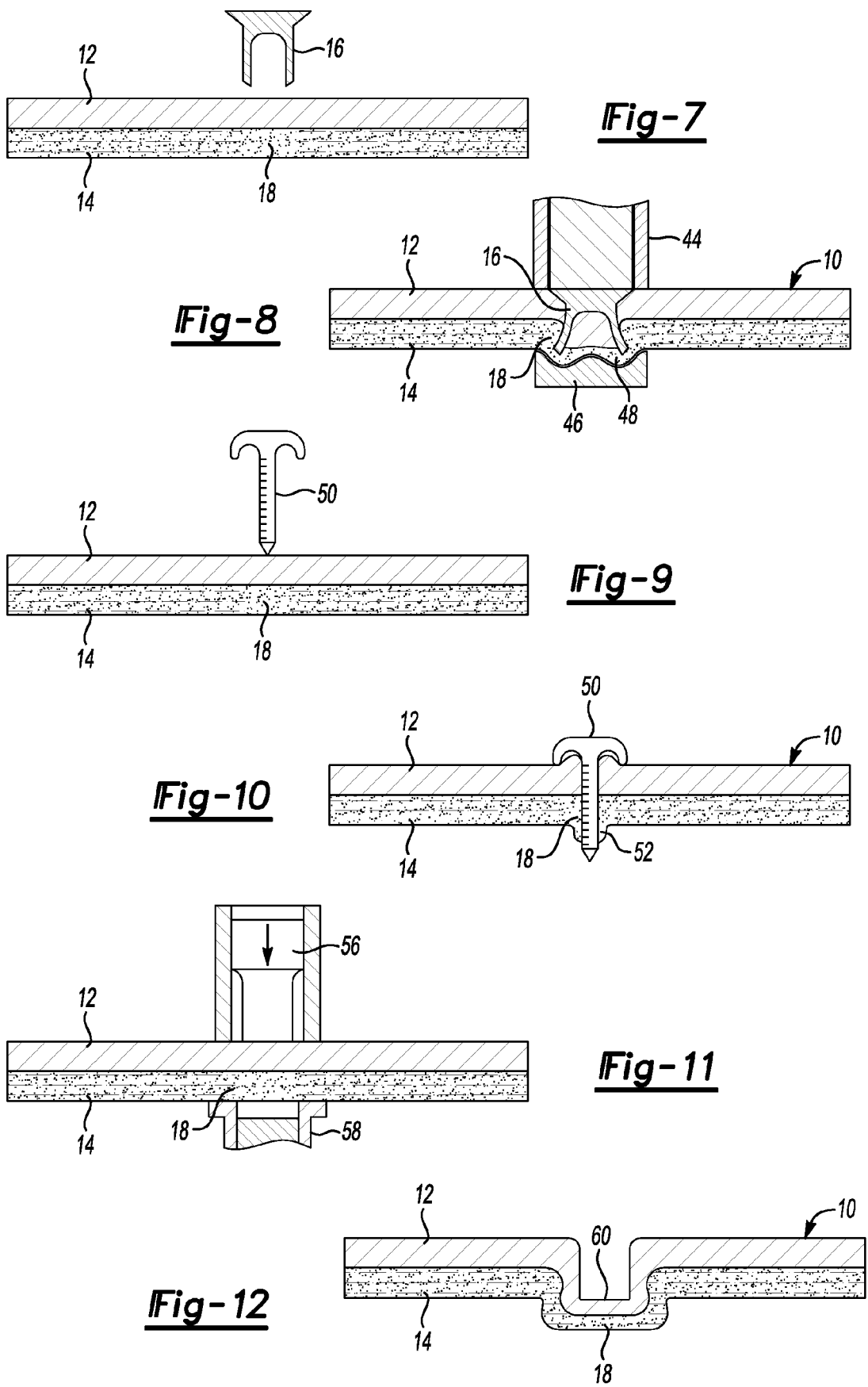

METHOD OF MAKING REINFORCED COMPOSITE ARTICLES WITH REDUCED FIBER CONTENT IN LOCAL AREAS AND ARTICLES MADE BY THE METHOD

TECHNICAL FIELD

This disclosure relates to reinforced composite parts and methods of making reinforced composite part assemblies with improved fastening performance.

BACKGROUND

As the automotive industry continues to focus on reducing the weight of vehicles to meet customer expectations on fuel economy and CAFE requirements, interest in alternative materials including carbon fiber composite applications has increased. In body-in-white structures, joining methods have traditionally relied on resistance-spot welding (e.g., in steel structures).

In the case of aluminum intensive vehicles and other mixed metal joining applications, self-piercing rivet (SPR) technology prevails. One advantage of SPR technology is that it is a high production volume assembly process. Further, it is compatible with adhesive, where both methods can be used in conjunction. The challenge often faced with SPR however, is that the substrate material must be ductile enough to form a "button", i.e., protrusion, which is the result of creating the joint and the necessary deformation to provide mechanical interlock. When composite parts do not have sufficient ductility to form a button on the obverse side, fibers may be exposed through cracks in this surface. Surface cracking and fiber displacement are undesirable, as they may reduce the durability of the joint and result in premature failure.

Other joining techniques that may be used to join metal parts and composite fiber reinforced parts include flow-drill screws, clinch joints and flow drilling processes. With each technique the fibers in the area where the fastener is inserted or the joint is to be formed may result in surface cracking or fiber displacement.

Composite materials, such as carbon fiber, glass fiber or natural fiber composites, can be limited in application due to challenges relating to joining parts together. Frequently, these composites have limited ductility and are not well adapted to large displacements and deformation required to join parts together.

Adhesives are used extensively to join composite parts together. Adhesive joining is a lower volume production method when used in isolation and is susceptible to displacement (i.e., movement between the parts to be joined) until the glue is cured.

Other methods, such as blind rivets, may be used to fasten parts to a composite component but it is necessary to first drill or pre-form a hole through the parts to insert the blind rivet. Assembly operations for drilling holes, aligning the holes, inserting the blind rivet and affixing the rivet add to the cost of assembly and the cost of tooling. A joining solution is needed that meets high volume production requirements and enables joining in a low ductility material.

This disclosure is directed to overcoming the above problems and other problems associated with the use of composite parts in applications where other parts are joined to a composite part.

SUMMARY

According to one aspect of this disclosure, a composite part is disclosed that comprises a resin matrix having a predetermined location for receiving a fastener. Fibers reinforce the resin matrix in a first portion of the resin matrix. A second portion of the resin matrix is substantially devoid of fibers at the predetermined location.

According to other aspects of this disclosure as it relates to a composite part, the fibers reinforcing the resin matrix may further comprise a woven mat that defines an opening in the mat provided at the predetermined location. Alternatively, the fibers reinforcing the resin matrix may be loose fibers that are dispersed in the first portion of the resin matrix, but that are not dispersed in the second portion of the resin matrix.

The composite part may be provided in combination with an assembled part that is assembled to the composite part with the fastener that is inserted through the assembled part and through a first side of the composite part. The combination may further comprise a protrusion disposed on a second side of the composite part that is opposite the point of insertion on the first side of the predetermined location.

According to another aspect of this disclosure, a method of making a fiber reinforced composite part is disclosed that comprises providing a fiber mat defining an opening. The fiber mat is inserted into a mold with the opening in a predetermined location in the mold. A liquid resin is supplied to the mold and envelopes the fiber mat. The resin is then hardened, or cured, in the mold. The resin fills the opening to provide a substantially fiberless fastener receptacle area on the fiber reinforced composite part in the predetermined location.

According to other aspects of the disclosure, the method may further comprise assembling a second part to the fiber reinforced composite part. The fiber reinforced composite part and the second part are joined together at the predetermined location. The step of joining the fiber reinforced composite part and the second part may further comprise forming a clinch joint in the second part and the fastener receptacle area in the fiber reinforced composite part. Alternatively, the step of joining the fiber reinforced composite part and the second part may further comprise inserting a fastener through the second part and into the fastener receptacle area in the fiber reinforced composite part. The fastener may be a rivet, a self-piercing rivet, a self-tapping screw, or a flow drill screw.

According to another aspect of this disclosure, an alternative method is disclosed for making a fiber reinforced composite part with loose fiber material. The alternative method comprises shielding a predetermined portion of a mold while depositing a loose fiber material in the mold so that the loose fiber material is not deposited in the predetermined portion of the mold. A liquid resin is supplied to a mold that encapsulates the loose fiber reinforcement material and fills the predetermined portion of the mold. The resin is then hardened to form a substantially fiberless fastener receptacle area in the fiber reinforced composite part.

This disclosure is directed to solving the above problems and other problems as will be more specifically described below with reference to the attached drawings of the illustrated embodiments.

BRIEF DESCRIPTION OF THE DRAWINGS

FIG. 7 is a cross-sectional view of a part assembled to a fiber reinforced composite part with a self-piercing rivet in position to be inserted into the parts.

FIG. 8 is a cross-sectional view of the part assembled to the fiber reinforced composite part with the self-piercing rivet fastening the parts together.

FIG. 9 is a cross-sectional view of a part assembled to a fiber reinforced composite part with a flow drill screw in position to be inserted into the parts.

FIG. 10 is a cross-sectional view of the part assembled to the fiber reinforced composite part with the flow drill screw fastening the parts together.

FIG. 11 is a cross-sectional view of the part assembled to a fiber reinforced composite part with a clinch joint forming tool in position to join the parts.

FIG. 12 is a cross-sectional view of the part assembled to the fiber reinforced composite part with a clinch joint fastening the parts together.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
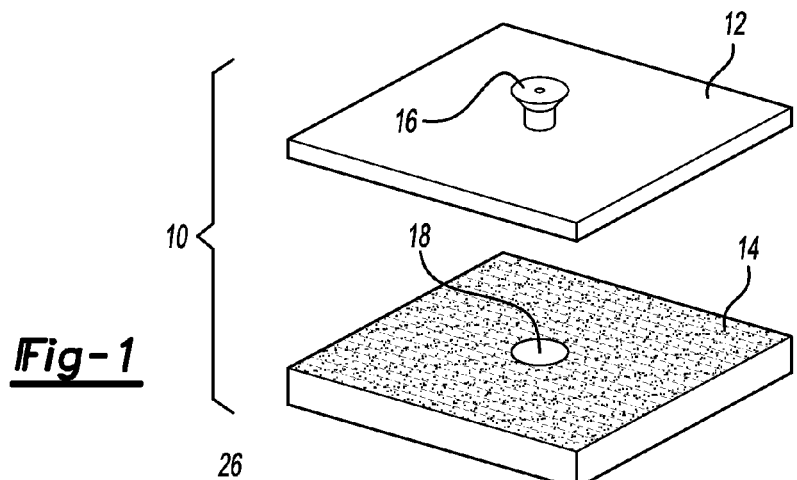
FIG. 1 is an exploded perspective view of a part that is to be fastened with a fastener to a fiber reinforced composite part having a fastener receptacle area that is not reinforced with fibers.

Referring to FIG. 1, a composite part assembly 10 is shown to include an aluminum part 12 that is positioned to be joined to a fiber reinforced composite part 14 by a self-piercing rivet 16. The self-piercing rivet 16 is shown aligned with a fastener receptacle area 18 in the fiber reinforced composite part 14. Assembly of the parts with the self-piercing rivet 16 is described below with reference to FIGS. 7 and 8.

Figure 2:
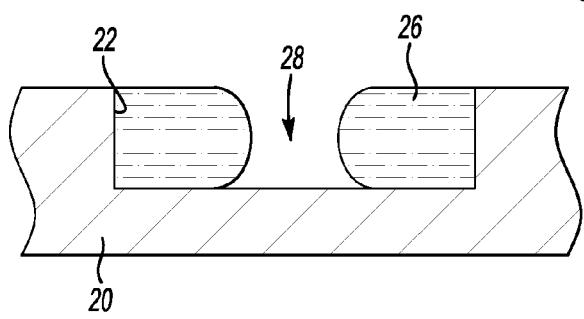
FIG. 2 is a fragmentary cross-sectional view of the mold that has a fiber mat that defines an opening and is disposed in the mold.

Referring to FIG. 2, a mold 20 is illustrated that includes a mold cavity 22. A woven fiber mat 26 defines an opening 28 in a predetermined area that corresponds to the desired location of the fastener receptacle area 18 (shown in FIG. 1). The woven fiber mat 26 is loaded into the mold cavity 22 with the opening 28 in the predetermined area.

Figure 3:
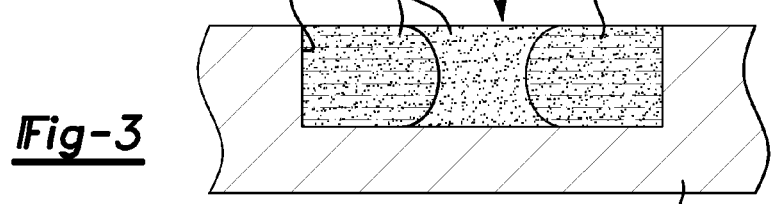
FIG. 3 is a fragmentary cross-sectional view of the mold filled with a resin matrix material and the fiber mat.

Referring to FIG. 3, the mold 20 is shown with the mold cavity 22 filled with the woven fiber mat 26 and a resin matrix 30 that is poured, injected or otherwise supplied to the mold cavity 22. The resin matrix fills interstitial spaces within the woven fiber mat 28 and also fills the opening 28 in the fiber mat 26. The resin matrix 30 in the opening 28 comprises the fastener receptacle area 18 (shown in FIG. 1).

Figure 4:
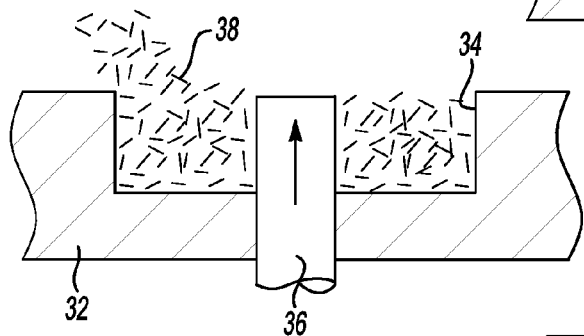
FIG. 4 is a fragmentary cross-sectional view of a mold including a pin that is movable between an extended position to prevent loose fibers from being deposited in a predetermined area of the mold and subsequently backfilled with resin when the pin is retracted.

Referring to FIG. 4, an alternative embodiment of a mold 32 is illustrated that includes a mold cavity 34 in which a pin 36 is disposed. The pin 36 is shown in its extended position in FIG. 4. Loose fibers 38 are supplied to the mold cavity 34 while the pin 36 is in its extended position. The pin 36 in the extended position prevents the loose fibers 38 from being deposited in the space within the mold cavity 34 with the pin 36 in its extended position is disposed. The pin 36 in its extended position shields the portion of the mold cavity 34 from the deposit of the fibers 38.

Figure 5:
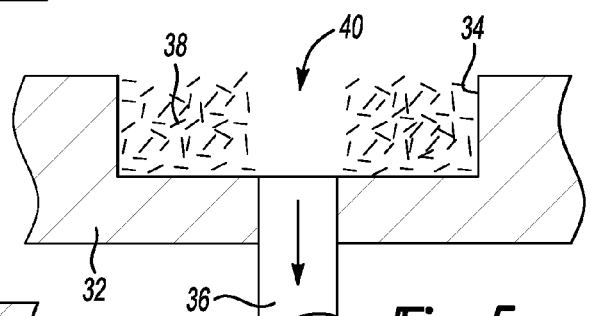
FIG. 5 is a fragmentary cross-sectional view of the mold including the pin that is movable between an extended position and a retracted position in the refracted position showing the loose fibers deposited around the predetermined area.

Referring to FIG. 5, the alternative mold 32 is shown with the pin 36 in the refracted position. The mold cavity 34 includes the loose fiber throughout except where the void 40 is defined within the loose fibers 38 and above the pin 36. It should be understood that the void 40 may include a limited number of fibers 38 because there is no partition preventing the fibers 38 from being inadvertently deposited within the void.

Figure 6:
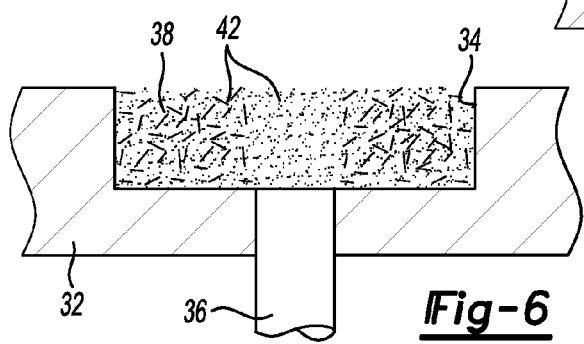
FIG. 6 is a fragmentary cross-sectional view of the mold filled with a resin matrix material and including the pin that is movable between an extended position and a retracted position in the refracted position showing the loose fibers deposited around the predetermined area.

Referring to FIG. 6, the alternative mold 32 is shown with the mold cavity 34 filled with loose fibers 38 that are now encapsulated in a resin matrix 42. The resin matrix 42 fills the interstitial areas between the loose fibers 38 and also fills the void 40 (shown in FIG. 5). The resin 42 in the void 40 comprises the fastener receptacle area 18 (shown in FIG. 1). The resin 42 and the void 40 may include some inadvertently deposited fibers 38. However, the density of the fibers 38 should be markedly less than the void area 40 with a fiber density of less than 10% of the fiber density in the other parts of the resin matrix 42.

It should be understood that the resin 42 may be injected as a two-step resin injection with a two-step cure. For example, with the pin extended, the mold may be filled with loose fiber. Resin may be injected into the mold 32 and partially cured.

Referring to FIG. 7, an aluminum part 12 and a fiber reinforced composite part 14 are shown in a position to be assembled together by the insertion of a self-piercing rivet 16. The self-piercing rivet 16 is aligned with the fastener receptacle area 18 within the fiber reinforced composite part 14.

Referring to FIG. 8, the self-piercing rivet 16 is driven through the panels 12 and 14 by a rivet punch 44. A back-up die 46 backs up the fiber reinforced composite part 14 in the fastener receptacle area 18. Insertion of the self-piercing rivet 16 results in a button-shaped protrusion 48 being formed on the obverse side of the fiber reinforced composite part 14.

Referring to FIG. 9, a flow drill screw 50 is aligned with an aluminum part 12 and a fiber reinforced composite part 14. The flow drill screw 50 is shown ready to be inserted into the aluminum part 12 and is in alignment with the fastener receptacle area 18 provided by the fiber reinforced composite part 14. The flow drill screw 50 is driven through the aluminum part 12 first by rapidly rotating the flow drill screw 50 while applying pressure to drive the flow drill screw 50 through the aluminum part 12. After initial penetration by the flow drill screw 50, the speed of rotation of the flow drill screw 50 is reduced and the threads on the flow drill screw 50 form a tapped hole in the aluminum part 12 and the fiber reinforced composite part 14.

While the aluminum part 12, as shown in FIG. 1, does not include a clearance hole, it should be appreciated that a clearance hole may be provided through the aluminum part 12. If so, the clearance hole (not shown) should be aligned with the fastener receptacle area 18 in the fiber reinforced composite part 14. The thickness of the aluminum part 12 and the material properties of the aluminum part 12 are factors that must be assessed in determining whether a hole must be provided in the aluminum part 12 for the flow drill screw 50.

Referring to FIG. 10, the flow drill screw 50 is shown securing the aluminum part 12 to the fiber reinforced composite part 14. The flow drill screw 50 integrally forms a bushing area 52 on the fiber reinforced composite part 14. The flow drill screw 50 is inserted through the fastener receptacle area that is substantially void of fiber. The bushing 52 is substantially free from fiber penetration, cracks or splits that would ordinarily be formed by the flow drill screw 50 being inserted through a fiber reinforced composite part 14 that does not include a fastener receptacle area 18.

Referring to FIG. 11, a clinch joint punch 56 is shown aligned with a clinch joint back-up die 58. The fastener receptacle area 18 of the fiber reinforced composite part 14 is disposed between and aligned with the clinch joint punch 56 and the clinch joint back-up die 58.

Referring to FIG. 12, a composite part assembly 10 is shown with the aluminum part 12 assembled to the fiber reinforced composite part 14 by a clinch joint 60. The clinch joint 60 is formed in the fastener receptacle area 18 that is substantially void of reinforcing fibers. Reinforcing fibers in the fiber reinforced composite part 14 reinforce the part 14 while the absence of fibers in the fastener receptacle area 18 allow the clinch joint 60 to be formed without cracking or splitting caused by fibers being forced through the obverse side of the fastener receptacle area 18 of the fiber reinforced composite part 14.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A combination of a composite part, an assembled part, and a fastener, comprising:
   a resin matrix forming the composite part;
   fibers reinforcing a first portion of the resin matrix, and a second portion of the resin matrix at a predetermined location for receiving the fastener that is substantially devoid of fibers;
   the fastener extending through the assembled part and a first side of the composite part at the predetermined location to join the composite part to the assembled part; and
   a protrusion of resin matrix formed of the second portion that is substantially devoid of fibers displaced by the fastener on a second side of the composite part that is opposite the first side in the predetermined location.

2. The composite part of claim 1 wherein the fibers reinforcing the resin matrix further comprise a woven mat that defines an opening in the mat provided in the predetermined location.

3. The combination of claim 1 wherein the fibers reinforcing the resin matrix are loose fibers that are dispersed in the first portion of the resin matrix and not in the second portion of the resin matrix.

* * * * *